(No Model.)  T. R. TIMBY.  6 Sheets—Sheet 1.
Coast Defense.

No. 239,203.  Patented March 22, 1881.

Attest
Geo. T. Smallwood Jr.
Harry E. Knight

Inventor:
Theodore R. Timby
By Knight Bros
Attys (No Model.)  
T. R. TIMBY.  
Coast Defense.

No. 239,203.  
Patented March 22, 1881.

Attest:  
Geo. F. Smallwood Jr.  
Harry C. Knight

Inventor:  
Theodore R. Timby  
By Knight Bros.  
Attys.

(No Model.)  T. R. TIMBY.  6 Sheets—Sheet 5.
Coast Defense.
No. 239,203.  Patented March 22, 1881.

Attest:
Geo. T. Smallwood, Jr.
Harry E. Knight

Inventor
Theodore R. Timby
By Knight Bros.
Attys (No Model.) 6 Sheets—Sheet 6.

T. R. TIMBY.
Coast Defense.

No. 239,203. Patented March 22, 1881.

Attest:
Geo. T. Smallwood Jr.
Harry E. Knight

Inventor:
Theodore R. Timby
By Knight Bros.
attys.

United States Patent Office.

THEODORE R. TIMBY, OF NYACK, NEW YORK.

COAST-DEFENSE.

SPECIFICATION forming part of Letters Patent No. 239,203, dated March 22, 1881.

Application filed December 1, 1880. (No model.)

*To all whom it may concern:*

Be it known that I, THEODORE R. TIMBY, a citizen of the United States, residing at Nyack, in the county of Rockland and State of New York, have invented certain Improvements in Coast-Defenses, of which the following is a specification.

My invention consists, primarily, in mounting a tower or turret on ways, so that, beside a rotary movement on a vertical axis, it may, when desired, be moved around a center outside of itself, so as to change its position, and thereby place it out of range of an enemy's guns.

My invention further consists in combining, with a revolving tower or turret, a mole or moles, around or between which the said tower or turret may be revolved, so that a portion of its face may be masked when in action; or it may be completely covered, when desired, to protect it from an enemy's fire.

In order that the invention may be fully understood, I will proceed to describe it with reference to the accompanying illustrative drawings, in which—

Figure 1:
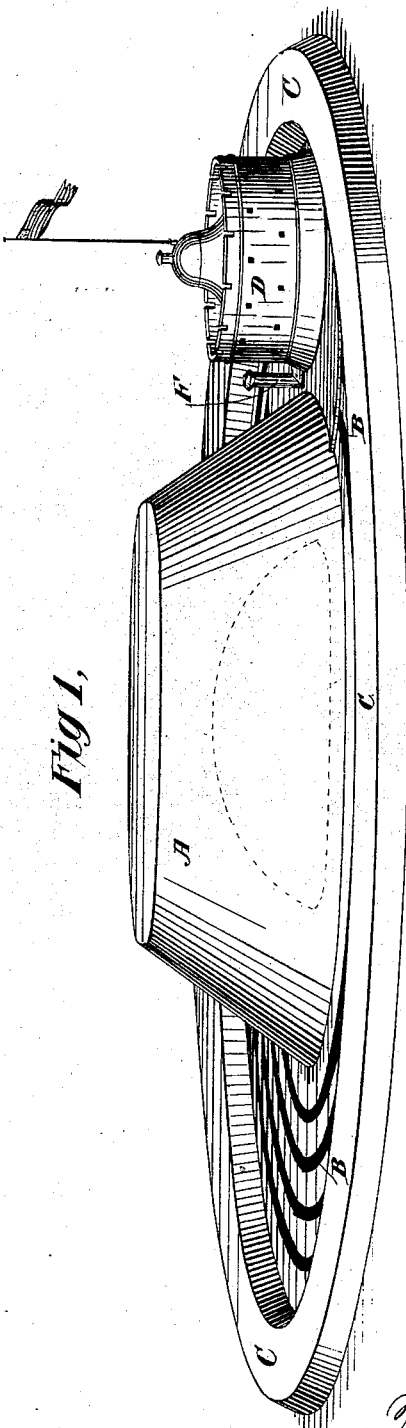
Figure 2:
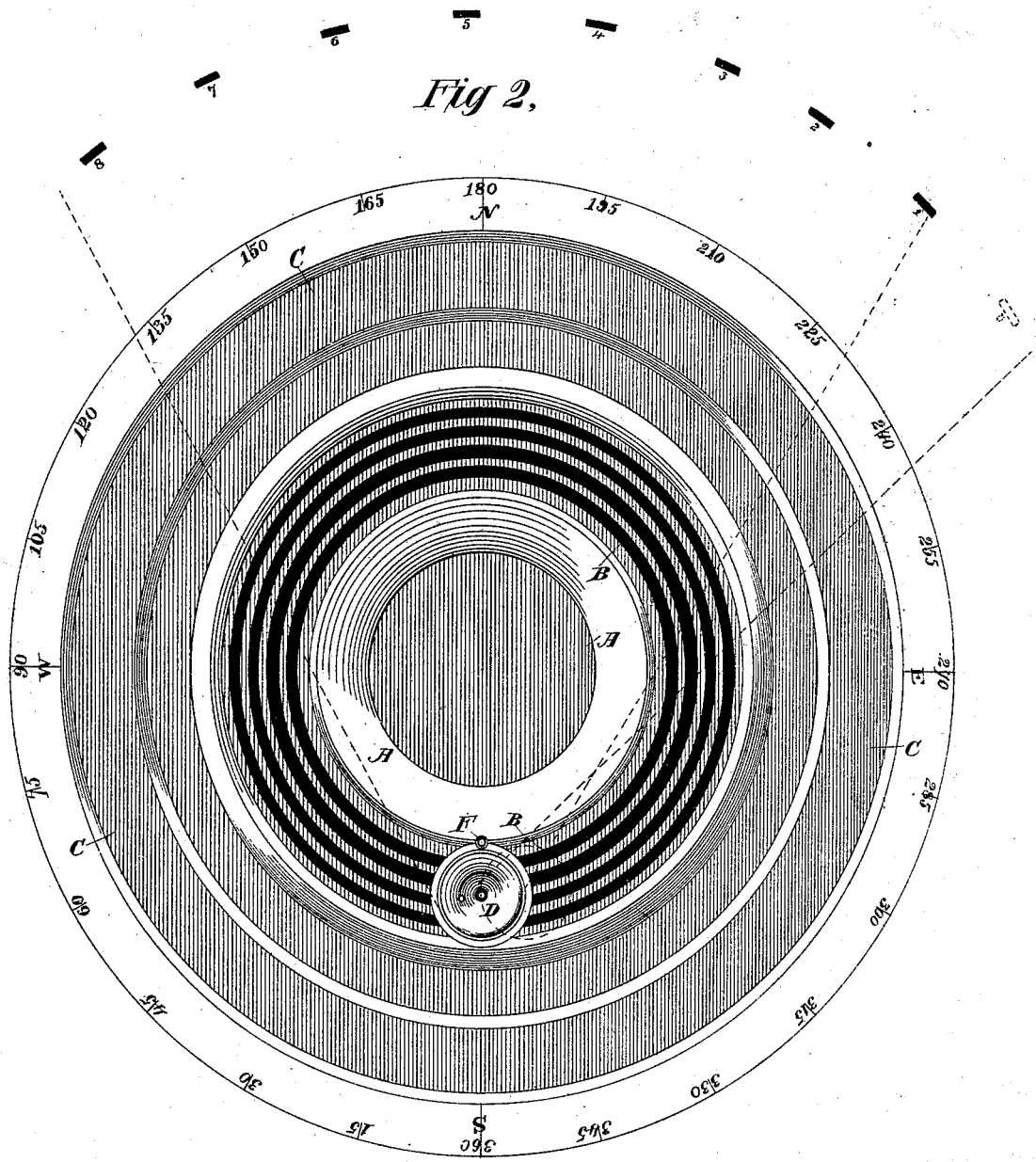
Figure 3:
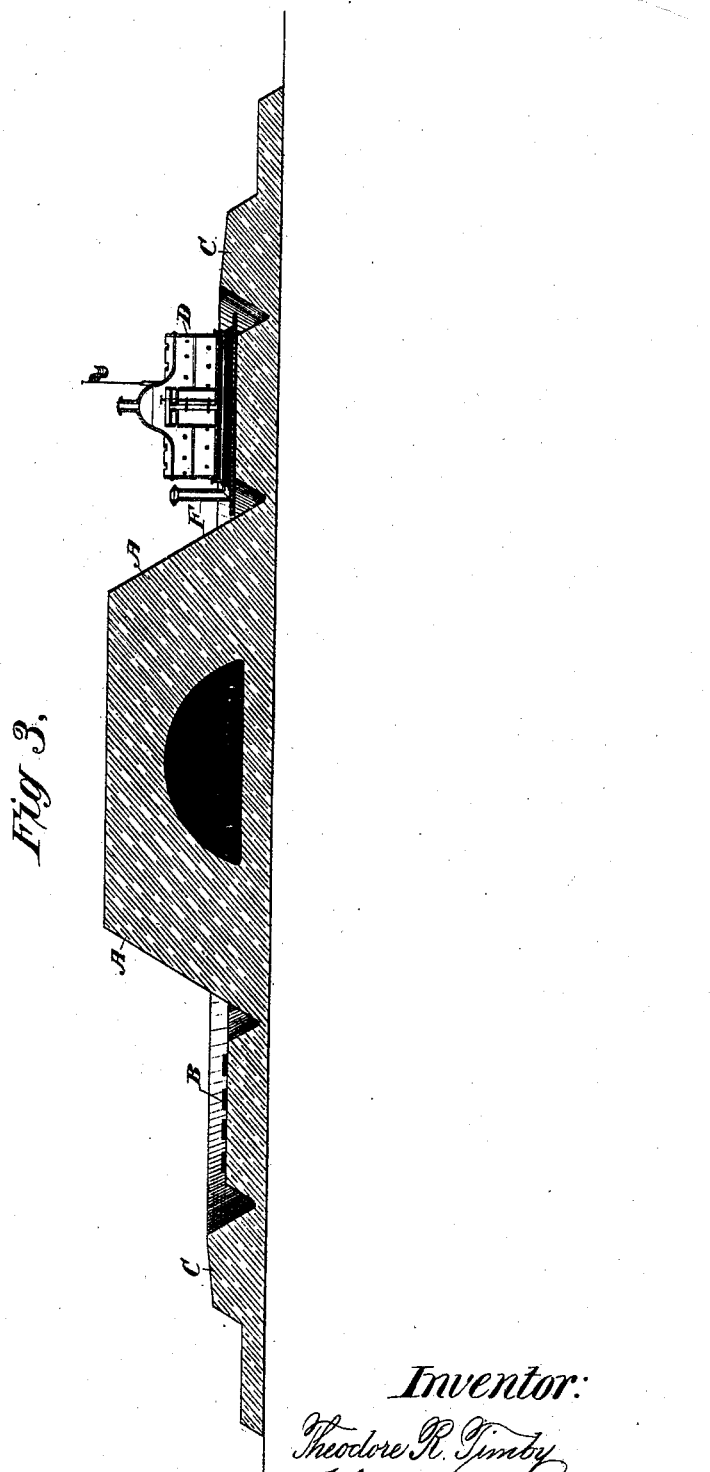
Figure 4:
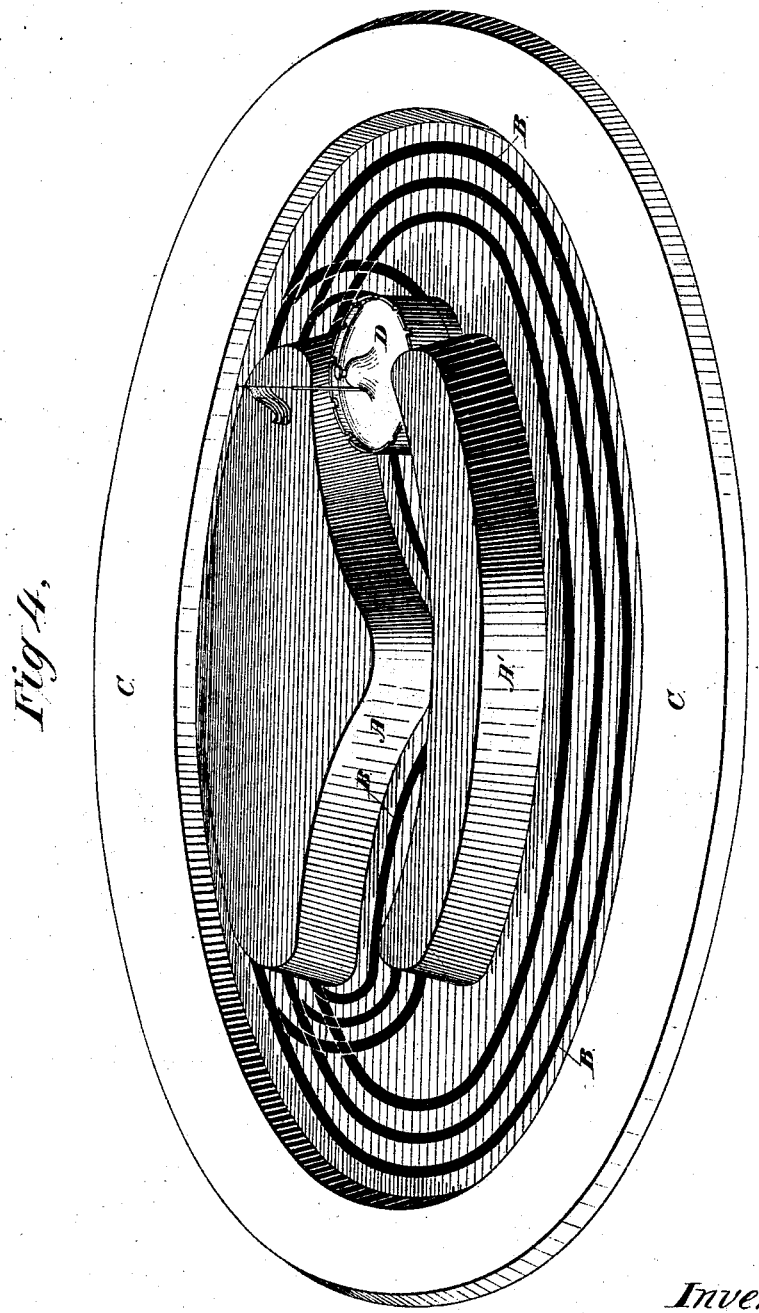
Figure 5:
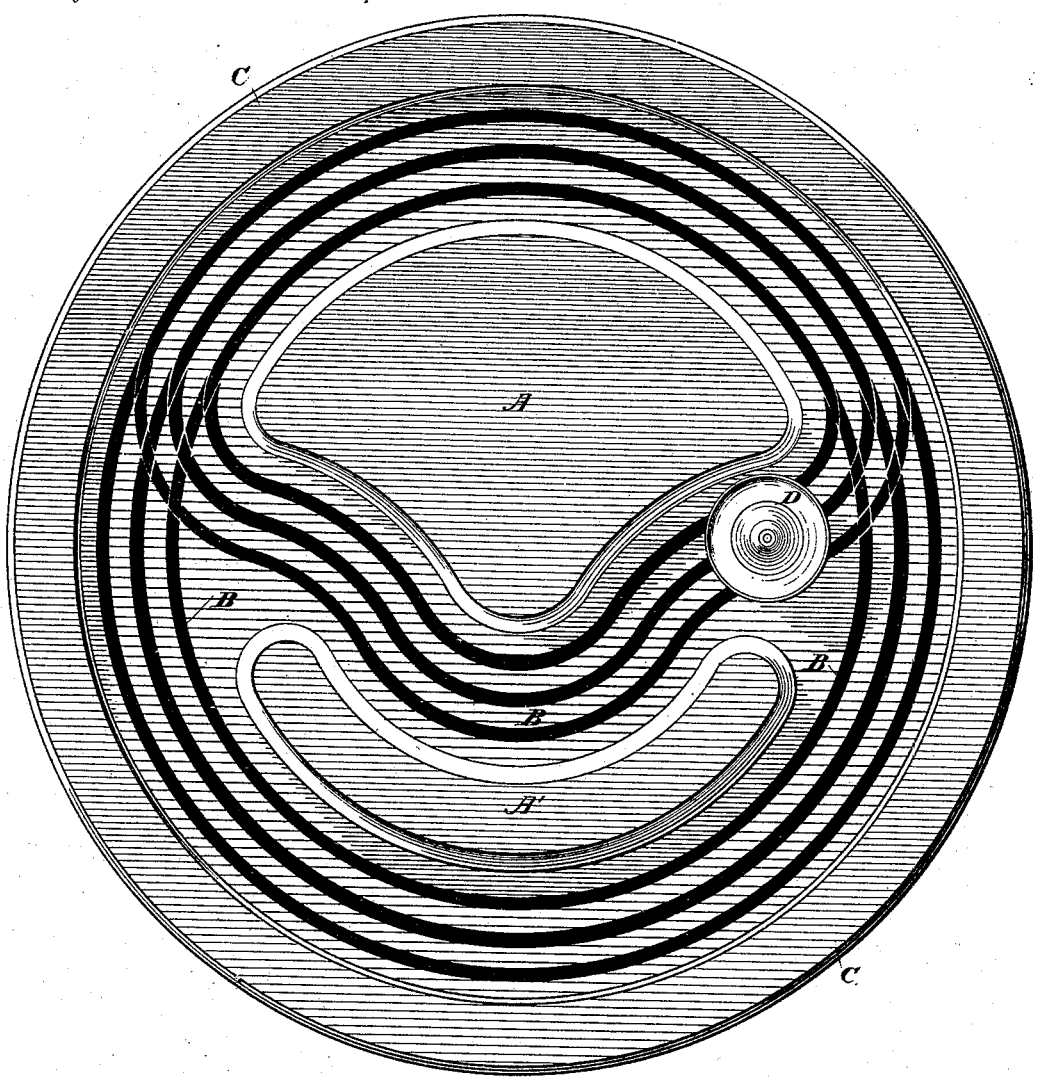

Figure 1 is a perspective view of a revolving tower and protecting-mole. Fig. 2 is a plan of the same. Fig. 3 is a vertical section thereof. Fig. 4 is a perspective view, illustrating a mode of moving a tower around or between two moles. Fig. 5 is a plan of the same.

In the drawings, A represents an impregnable mole or mound, which may be constructed of either iron, wood, masonry, or of earth. It is preferably made of earth, and may be made hollow, as illustrated in Fig. 3, so as to constitute a magazine for ammunition or garrison-stores, &c. The mole may be circular, elliptical, or of any other desired shape. The said mole is surrounded by a track or way, B, of circular, elliptical, or any preferred regular or irregular form, and this is preferably surrounded by a parapet or breast-work, C, for the protection of the track.

Figure 6:
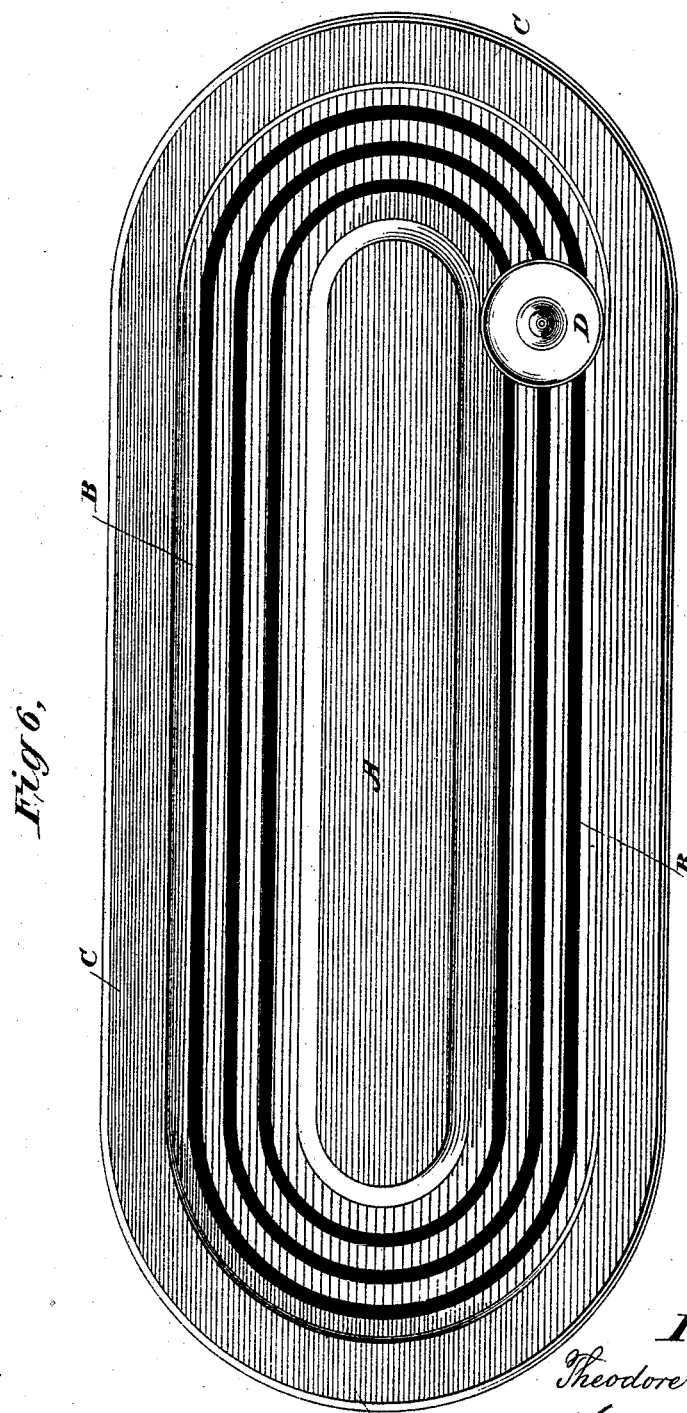

Figs. 4 and 5 show a second mole, A', and the ways B, extending between the two moles A A', as well as around both. Fig. 6 is a plan view, showing an elongated mole, with parallel sides and with parallel tracks or ways, connected by curves at the ends.

D represents my revolving tower or turret in position, mounted to move around the mole A or A', or between the two, upon the ways B, and propelled by any suitable mechanism. Steam or compressed air may be used as a power. The means of propulsion do not require specific description, as they will be varied to suit the exigencies of the case, and suitable devices for the purpose are familiar to engineers and mechanics.

E represents a platform or bed, forming the base on which the movable tower or turret D revolves on a vertical axis, as originally described and claimed by me in United States Letters Patent No. 36,593, issued the 30th of September, 1862, and antedated the 8th of July, 1862.

Other modes of rotating the tower or turret for training the guns will be the subject of future patents.

F represents a smoke-stack for the steam-engine or other furnace. It is preferably located between the revolving tower or turret D and the mole A, in order to prevent its exposure.

The relative proportions of the mole and revolving tower may be varied at pleasure. In practice the mole may be larger in diameter relatively to the revolving tower or turret than it is here represented. I am thereby enabled to mask or cover the revolving tower or turret from one hundred or even one hundred and twenty degrees of the horizon, as illustrated in Fig. 2, thus affording complete seclusion and protection from an enemy located anywhere within that angle.

By moving the revolving tower in its orbit as required it may be passed out of cover for the purpose of delivering its fire, and then returned under cover for protection; or it may be arranged so as to expose one-half or even less of its area while delivering an effective fire against an enemy.

Two or more towers may be used with one mole; or two or more moles may be used with one, two, or more towers.

My invention possesses great practical value in the facility it affords for attacking and destroying an approaching enemy in detail. This is illustrated by diagram in Fig. 2.

Supposing an attacking fleet to be moving on the works in line of battle, as illustrated at 1 2 3 4 5 6 7 8, the position of the tower or turret D under cover of the mole renders it impossible to concentrate a fire upon it, while by moving the tower or turret to the position shown in dotted lines its fire can be delivered against the first vessel, and only be exposed to the fire of a single vessel, being covered by the mole from all the rest. This vessel being disabled or destroyed, the next one can be taken separately, and so on in detail.

The mobility of the tower or turret also admits of its being quickly placed out of range as often as required, so as to render it impossible for even the single vessel which is being struck to deliver an effective fire against the tower, while the fire of the moving tower continues to be delivered with accuracy and effect.

A particular mode of training and discharging the guns with the required relation to the movement of the tower or turret, so as to keep the fire automatically directed against any required point, will be made the subject of a separate application.

Having thus described my invention, the following is what I claim as new therein and desire to secure by Letters Patent:

1. A turret or tower made to revolve on a vertical axis and mounted on suitable ways, so as to move around, or partially around, another center or centers, either in a concentric or eccentric line, for mounting, moving, training, and handling ordnance or light arms.

2. One or more rotating towers, in combination with one or more moles, masks, or covers, around, or partially around, which the tower or towers may be moved at will, substantially as set forth.

THEODORE R. TIMBY.

Witnesses:
OCTAVIUS KNIGHT,
WALTER ALLEN.